US008904667B2

(12) United States Patent
Sauerbeck et al.

(10) Patent No.: US 8,904,667 B2
(45) Date of Patent: Dec. 9, 2014

(54) DRYING DEVICE CONTAINING A TITANIUM ALUMINUM PHOSPHATE

(75) Inventors: Silke Sauerbeck, Bruckmühl (DE); Rolf Kurzhals, Landsberg (DE); Arno Tissler, Tegernheim (DE)

(73) Assignee: Clariant Produkte (Deutschland) GmbH, Frankfurt am Main (DE)

( * ) Notice: Subject to any disclaimer, the term of this patent is extended or adjusted under 35 U.S.C. 154(b) by 262 days.

(21) Appl. No.: 13/333,329

(22) Filed: Dec. 21, 2011

(65) Prior Publication Data

US 2012/0159804 A1    Jun. 28, 2012

(30) Foreign Application Priority Data

Dec. 22, 2010    (DE) .................. 10 2010 055 729

(51) Int. Cl.
| | |
|---|---|
| *F26B 5/16* | (2006.01) |
| *D06F 58/26* | (2006.01) |
| *C01B 37/06* | (2006.01) |
| *B01J 20/28* | (2006.01) |
| *C01B 33/08* | (2006.01) |
| *A47L 15/00* | (2006.01) |
| *B01J 20/18* | (2006.01) |
| *A47L 15/48* | (2006.01) |

(52) U.S. Cl.
CPC ............ *B01J 20/2803* (2013.01); *D06F 58/26* (2013.01); *C01B 37/06* (2013.01); *B01J 20/28011* (2013.01); *A47L 2401/18* (2013.01); *A47L 2501/12* (2013.01); *A47L 2401/14* (2013.01); *C01B 33/08* (2013.01); *B01J 20/28042* (2013.01); *A47L 15/0042* (2013.01); *B01J 20/186* (2013.01); *A47L 15/481* (2013.01); *Y10S 95/902* (2013.01)

USPC ........ 34/263; 34/273; 34/409; 34/92; 95/902; 502/214; 423/306; 68/13 R; 62/324.1

(58) Field of Classification Search
USPC ........ 34/263, 273, 353, 409, 92; 95/117, 902; 502/214; 423/306, 700; 68/13 R, 19, 68/20; 62/112, 324.1
See application file for complete search history.

(56) References Cited

U.S. PATENT DOCUMENTS 2,417,462 A * 3/1947 Adler ............................ 423/155
2,770,522 A * 11/1956 Bailes et al. ................... 423/63
(Continued)

FOREIGN PATENT DOCUMENTS

| CH | 703 845 A2 | 3/2012 |
|---|---|---|
| DE | 103 56 787 A1 | 7/2005 |

(Continued)

OTHER PUBLICATIONS

Douglas S. Coombs et al., "Recommended Nomenclature for Zeolite Minerals: Report of the Subcommittee on Zeolites of the International Mineralogical Association, Commission on New Minerals and Mineral Names," *The Canadian Mineralogist*, vol. 35, pp. 1571-1606 (1997).

(Continued)

*Primary Examiner* — Steve M Gravini
(74) *Attorney, Agent, or Firm* — Anthony A. Bisulca (57) ABSTRACT

A drying device comprising a titano-alumino-phosphate with thermal management for the more efficient drying of objects and appliances, and its production. Further, a drying method for obtaining dried objects and appliances, as well as a method for regeneration accompanied by the desorption of water from water-containing titano-alumino-phosphate.

18 Claims, 2 Drawing Sheets

(56) References Cited

U.S. PATENT DOCUMENTS

| | | | |
|---|---|---|---|
| 4,500,651 A * | 2/1985 | Lok et al. .................. | 502/208 |
| 4,684,617 A | 8/1987 | Lok et al. | |
| 4,801,309 A | 1/1989 | Lok et al. | |
| 6,383,273 B1 * | 5/2002 | Kepner et al. ............. | 106/15.05 |
| 7,093,428 B2 * | 8/2006 | LaBarge et al. ............ | 60/286 |
| 7,208,446 B2 * | 4/2007 | Stamires et al. ........... | 502/355 |
| 2004/0045187 A1 * | 3/2004 | Curry et al. ............... | 34/595 |
| 2004/0089001 A1 * | 5/2004 | Kakiuchi et al. ........... | 62/112 |
| 2004/0093876 A1 * | 5/2004 | Inagaki et al. .............. | 62/112 |
| 2009/0025403 A1 * | 1/2009 | Kakiuchi et al. ........... | 62/112 |
| 2009/0025557 A1 * | 1/2009 | Moschutz et al. .......... | 95/148 |
| 2010/0107673 A1 | 5/2010 | Nakaguro et al. | |
| 2010/0186251 A1 | 7/2010 | Stolze | |
| 2011/0186094 A1 * | 8/2011 | Hong ......................... | 134/115 R |
| 2011/0198405 A1 * | 8/2011 | Krausch et al. ............ | 236/44 C |
| 2012/0159804 A1 * | 6/2012 | Sauerbeck et al. ......... | 34/353 |
| 2012/0240962 A1 * | 9/2012 | Jerg et al. .................. | 134/25.2 |
| 2013/0011453 A1 * | 1/2013 | Latta et al. ................. | 424/401 |
| 2013/0146091 A1 * | 6/2013 | Dreossi et al. ............. | 134/18 |
| 2013/0323163 A1 * | 12/2013 | Sauerbeck et al. ......... | 423/700 |

FOREIGN PATENT DOCUMENTS

| | | | | |
|---|---|---|---|---|
| DE | 20 2008 011 159 U1 | 11/2008 | | |
| DE | 10 2008 039 892 A1 | 3/2010 | | |
| DE | 10 2009 034 850.6 | 2/2011 | | |
| EP | 0 161 488 B1 | 11/1985 | | |
| EP | 0 380 825 A2 | 8/1990 | | |
| EP | 1 652 817 A1 | 5/2006 | | |
| EP | 2 022 565 A1 | 11/2009 | | |
| JP | 60-260420 | 12/1985 | | |
| JP | 2005-185891 | 7/2005 | | |
| JP | 2006-263717 A | 10/2006 | | |
| WO | WO 02/40149 | * | 5/2002 | ............ B01J 20/00 |
| WO | WO 03/035549 A1 | | 5/2003 | |
| WO | WO 2009/010446 A1 | | 1/2009 | |
| WO | WO 2011/154530 A1 | | 12/2011 | |
| WO | WO 2012/033250 | * | 3/2012 | ............ B01D 53/14 |
| WO | WO 2012/168957 | * | 12/2012 | ............ B01J 20/00 |

OTHER PUBLICATIONS

EP Search Report for EP 11 19 4992 dated Apr. 18, 2012.
Georg Thieme Verlag, Zeolithe, ROMPP Online, Version 3.15, http://www.roempp.com, Dec. 2009.
Partial Translation of DE 10 2010 055 729.3 Office Action from the German Patent and Trademark Office dated Aug. 4, 2011.
International Search Report PCT/EP2011/059705 dated Oct. 17, 2011.

* cited by examiner

DRYING DEVICE CONTAINING A TITANIUM ALUMINUM PHOSPHATE

CROSS-REFERENCE TO RELATED APPLICATIONS

This application claims benefit under 35 U.S.C. §119 to prior German Application No. DE 10 2010 055 729.3, filed Dec. 22, 2010, the entire disclosure of which is incorporated herein by reference.

BACKGROUND OF THE INVENTION

The present invention relates to a drying device with thermal management comprising a titano-alumino-phosphate as adsorbent for energy-improved drying of objects and appliances, and its production.

The present invention further relates to a method for removing residual moisture from objects and appliances, as well as a method for regenerating a water-containing titano-alumino-phosphate.

Microporous structures such as zeolites which also include alumino-phosphates (APO), silico-alumino-phosphates (SAPO), titano-alumino-phosphates (TAPO) or titano-silico-alumino-phosphates form a structurally diverse family of silicate minerals with complex structures. They occur naturally but are also manufactured synthetically. The minerals of this group, depending on the structure type, can store up to 40 per cent of their dry weight as water which is released again when they are heated to 350 to 400° C. Through the regeneration, material is obtained which can be used again for drying.

However, it is not only alumino-silicate zeolites that display structural diversity and good adsorptivity, but also the group of alumino-phosphates. Structures of this group are classified by the "Structure Commission of the International Zeolite Association" on the basis of their pore sizes according to IUPAC rules (International Union of Pure and Applied Chemistry). As microporous compounds they have pore sizes of 0.3 nm to 0.8 nm. The crystal structure and thus the size of the pores and channels formed is controlled by synthesis parameters such as pH, pressure and temperature. Further factors such as the use of templates during synthesis, as well as the Al/P/Ti/(Si) ratio, also determine the resulting porosity. They crystallize into more than two hundred different variants, into more than two dozen different structures, which have different pores, channels and cavities.

Because of the balanced number of aluminum and phosphorus atoms, titano-alumino-phosphates are neutral in charge. Titano-silico-alumino-phosphates (TAPSO) form as a result of the isomorphic exchange of phosphorus with silicon. As a result of the exchange, surplus negative charges form which are balanced by the insertion of additional cations into the pore and channel system. The level of phosphorus-silicon substitution thus determines the number of cations required for balancing, and thus the maximum charging of the compound with positively charged cations, e.g. hydrogen or metal ions. As a result of the insertion of the cations the properties of the titano-silico-alumino-phosphates (TAPSO) can be set and modified.

The framework structures of the titano-alumino-phosphates are constructed from regular, three-dimensional spatial networks with characteristic pores and channels which can be linked with each other in one, two or three dimensions.

The above-mentioned structures are formed from corner-connected tetrahedral units ($AlO_4$, $PO_4$, $TiO_4$, optionally $SiO_4$), each consisting of aluminum and phosphorus, as well as optionally silicon, tetracoordinated by oxygen. The tetrahedra are called the primary structural units the connecting of which results in the formation of secondary structural units.

Titano-alumino-phosphates, silico-alumino-phosphates and titano-silico-alumino-phosphates are usually obtained by means of hydrothermal synthesis starting from reactive gels, or the individual Ti, Al, P, and optionally Si components obtained which are used in stoichiometric ratios. Titano-alumino-silico-phosphates (TAPSO) are produced analogously to silico-alumino-phosphates (SAPO) (DE 102009034850.6). The latter can be obtained crystalline by adding structure-directing templates, crystallization nuclei or elements (e.g. EP 161488).

Titano-alumino-phosphates are used primarily as catalysts in MTO (methanol-to-olefin conversion) processes in which, starting from methanol, a mixture of ethene and propene can be obtained with the aid of specific microporous catalysts.

Alumino-phosphates are popularly used in dehydration reactions (EP 2 022 565 A1) due to their good hygroscopic properties and their high adsorption power.

The adsorption power of the titano-silico-alumino-phosphates is particularly good due to the microporous framework structure. Titano-alumino-phosphates also display good adsorption behaviour as a large number of molecules can be adsorbed on the large surface area. If water molecules strike the surface of the titano-alumino-phosphate, they are adsorbed. An exothermal accumulation takes place on the surface, accompanied by the release of the kinetic energy of the water molecules as well as their adsorption energy which is released in the form of adsorption heat. The adsorption is reversible, wherein desorption represents the reverse process. In general, adsorption and desorption are present in a concurrent equilibrium which can be controlled and influenced by temperature and pressure.

Due to their low toxicity and their ease of handling, zeolites are already used for drying in various areas of everyday life.

Zeolites are known from the state of the art due to their hygroscopic properties. They are used for drying solutions or for dehumidifying closed spaces, as well as for drying textiles after a washing process or dishes in dishwashers.

Zeolites support the drying of textiles as they are usually dried at low temperatures and with minimal movement of the damp textiles. Temperatures that are too high can cause sensitive fabrics to shrink and become unusable. Alternatively, the drying process can be carried out statically, as a result of which however the drying period is increased as the water contained in the textiles can only be withdrawn from the surface.

The drying of dishes in dishwashers is ideally to be as uniform as possible, as otherwise undesired water spots can form. In particular in catering and at home, this leads to unsatisfactory visual results and often necessitates subsequent work on dishes, glasses and cutlery.

It is therefore attempted to optimize the drying process, e.g. by using better dishwashing detergent with pearlescent effect or removing more water from the textiles, already in the washing machine, which can be achieved by higher rotation speeds during spinning. However, the latter cannot be increased infinitely. Increasing the rotation speeds leads to a more pronounced stress on the material of the washing machine, to greater noise development as well as to the loss by textiles of their shape and elasticity as a result of over-vigorous spinning.

Various standard methods for drying objects and appliances are known from the state of the art. Textiles are usually dried by means of heated air streams accompanied by continuous movement.

WO 2009/010446 discloses an adsorption dryer which is used for drying textiles using below-atmospheric pressure and a heating device. A zeolite is additionally used as adsorbent for improving the drying effect. The additional use of a zeolite as adsorbent for removing moisture from textiles makes possible a more rapid drying of the textiles. However, this is associated with a higher energy outlay. To regenerate the water-containing zeolite, the latter must be heated, resulting in additional energy costs. The desorption of water from the framework structure of the zeolite is then carried out by a prolonged treatment at high temperatures of from 250° C. to 400° C.

Zeolites can also be used in dishwashers for the improved drying of dishes (DE 20 2208 011 159 U1). To regenerate the water-containing zeolite accompanied by desorption of the adsorbed water, a treatment at high temperatures (250° C. to 400° C.) is required which results in additional energy costs.

Despite the advantage that the drying times for dishes and textiles are shorter, it is disadvantageous that a lot of energy must be expended for each drying process. Although the drying effect is increased by the use of zeolites, the energy-intensive regeneration of the water-containing zeolite results in higher electricity costs. This is an undesired side-effect which is particularly undesirable at a time when energy efficiency is paramount.

Thus no energy-efficient drying devices or methods are known from the state of the art which make possible a low-energy and low-cost, as well as efficient, uniform and gentle drying of objects and appliances. The energy-efficient regeneration of the adsorbent for desorption of the adsorbed water represents a particular problem the solution to which is to date not known from the state of the art.

SUMMARY OF THE INVENTION

It was therefore the object of the present invention to provide a drying device which makes possible an energy-efficient drying method using an efficient drying agent, wherein energy and costs can be reduced, and makes possible an efficient, time-saving, uniform and gentle drying of objects and appliances.

This object is achieved according to aspects of the invention by a drying device with thermal management, comprising an adsorption container containing a titano-alumino-phosphate as adsorbent, and its production.

DETAILED DESCRIPTION OF THE INVENTION

By "thermal management" is meant according to aspects of the invention a utilization of residual heat while saving energy. This can take place for example after a rinsing process in a dishwasher, or in a drying device, such as for example a tumble dryer. The use of the residual heat serves to regenerate the water-containing titano-alumino-phosphate which can be used again after desorption.

By "thermal management" is meant further that the regeneration of the water-containing titano-alumino-phosphate is facilitated by the utilization of residual heat. As a result of the residual heat, part of the adsorbed water already desorbs from the pre-heated water-containing titano-alumino-phosphate, as only low temperatures are necessary to regenerate the latter. The remaining adsorbed water can be removed by low heat expenditure, as a result of which the energy costs can be kept low.

It is further understood by "thermal management" that heated air streams containing residual moisture can already regenerate the water-containing adsorbent. These air streams containing residual moisture, which are conducted from the reception space which contains objects and appliances with residual moisture to the adsorption device, heat the adsorbent which takes up the residual moisture from the air streams and is simultaneously regenerated again by the heat.

By the term "thermal management" is also meant according to aspects of the invention the use of the adsorption heat of an adsorbent, which forms as a result of the adsorption of water on a surface. This adsorption heat is released in the form of heat and can be used to remove residual moisture from reception spaces, chambers, reactors, objects or appliances in thermal contact with it. The latter are pre-heated by the adsorption heat and can thus have residual moisture removed from them more easily. The adsorption heat can also be used to heat liquids, e.g. operating liquids, such as rinsing water in dishwashers. This means advantageously that energy costs can be lowered.

The term "thermal management" used here further comprises the use of the adsorption heat of a drying device in adsorption mode to pre-heat operating liquids. The heat is emitted by direct thermal contact of the adsorption container with the container containing operating liquids, as a result of which a thermal exchange is guaranteed. This can be carried out particularly advantageously in dishwashers to heat rinsing water or similar.

Likewise meant by "thermal management" is the use of the adsorption heat to pre-heat dry air streams or carrier gas streams or other gases, e.g. air streams in tumble dryers. During the adsorption, the exothermal adsorption process can itself be utilized such that the objects and appliances are dried even more easily and quickly while reducing operating costs and energy as a result of the utilization of the adsorption heat.

It is further meant by "thermal management" that titano-alumino-phosphates can be used as heat reservoir materials. Released heat is taken up e.g. during a rinsing step in a dishwasher or a drying process in a tumble dryer by the adsorbent and can be emitted again as required, for example to regenerate water-containing adsorbent, or to pre-heat or heat objects and appliances. Unnecessary energy waste can be prevented by storing and re-using surplus energy. This application could also be used in large-scale industrial plants to utilize waste heat and residual heat still further.

The drying device according to aspects of the invention has the advantage, compared with the drying devices of the state of the art, that residual moisture can be removed from objects and appliances while reducing energy and costs, as well as in an efficient, time-saving, uniform and gentle manner using an energy-efficient drying method.

It was surprisingly found that titano-alumino-phosphates are better suited than other adsorbents to a use as adsorbents for drying objects and appliances. Because of their good water adsorption power, titano-alumino-phosphates can be used very satisfactorily as adsorbents for removing residual moisture from objects and appliances. As the adsorption power is many times higher than the adsorption power of zeolites or alumino-phosphates, the quantity of adsorbent required can be reduced while maintaining the same adsorption power due to the higher adsorption capacity.

By adsorption capacity is meant the insertion of compounds into the microporous framework structure of the adsorbent. Depending on the attachment sites in the framework structure of the adsorbent, a specific number of for example water molecules can be attached.

By "regeneration" is meant according to aspects of the invention the recovery of usable adsorbent starting from water-containing adsorbent. The water-containing titano-alumino-phosphate becomes usable again through the action of heat. The adsorbed water is removed under desorption and the adsorbent is thus recovered.

Surprisingly, titano-alumino-phosphates which are used in a drying device according to aspects of the invention can already be regenerated again at a low desorption temperature of from 20° C. to 150° C. As a result of their lower desorption temperature compared with zeolites, the energy costs that were previously incurred for the regeneration of the adsorbent can be reduced.

It is particularly advantageous that the titano-alumino-phosphate can already be regenerated at low temperatures of from 20° C. to 150° C., preferably 50° C. to 100° C., preferably up to 70° C. The energy costs for the regeneration of the titano-alumino-phosphate can thereby be kept very low.

According to aspects of the invention, the drying method comprises a method for regenerating water-containing titano-alumino-phosphate in the drying device using thermal management, comprising the steps of     a) regenerating the water-containing titano-alumino-phosphate by means of a thermal treatment,     b) obtaining regenerated titano-alumino-phosphate in the adsorption device and water-containing air,     c) removing the water-containing air by means of air flow.

After the regeneration, the titano-alumino-phosphate can be used again in the drying method according to aspects of the invention.

Surprisingly, titano-alumino-phosphates can be used as thermal management materials for adsorbing water because a regeneration already takes place by means of pre-heated air stream as a result of residual heat in the drying devices according to aspects of the invention. The drying device according to aspects of the invention also provides sufficient heat after the drying process such that the water-containing titano-alumino-phosphate can still be regenerated by means of the hot air streams.

Thus the regeneration of the water-containing titano-alumino-phosphate is easier and quicker as a result of using the temperatures prevailing in the drying device. Thus according to aspects of the invention hot air containing residual moisture is guided to the adsorbent by means of air flow. At the same time, the titano-alumino-phosphate is thus heated and can be regenerated by a thermal treatment at relatively low temperatures in the range of from 50° C. to 100° C. This saves energy, electricity costs and time, and results in a particularly efficient drying of objects and appliances, as the adsorbent can already be reused after a short time.

A thermal treatment is required to regenerate the water-containing titano-alumino-phosphate. The temperatures required for regeneration are in a range of from 50° C. to 100° C., with the result that the water-containing adsorbent can already be regenerated with moist, heated air (with up to 63% air humidity).

As a result of using the adsorbent, residual moisture is removed from the objects and appliances particularly uniformly because the moisture from the reception space, which contains the objects and appliances with residual moisture, is taken up immediately by the adsorbent and is then transported out of the drying device by means of air flow.

According to aspects of the invention, the air dried by the adsorbent can be conducted back into the reception space again in order to take up moisture there again. In the adsorption device, the adsorbent takes up moisture and simultaneously releases adsorption energy in the form of heat. Thus the air is not only dried, but in addition also heated. It is particularly advantageous that this dried, pre-heated air can take up more moisture in the reception space because it is even drier than the "starting" air.

A titano-alumino-phosphate which is a regenerable titano-silico-alumino-phosphate (SAPO) is preferably used as adsorbent. By substituting silicon for phosphorus, the adsorption property improves and even more water can be adsorbed using the same quantity of adsorbent. Through the further insertion of titanium into the framework structure of the silico-alumino-phosphates by admixing $TiO_2$ to the gel-like starting mixture, the framework structure can be retained, which however improves the material properties. Typical catalytic properties are scarcely influenced by the Ti insertion, i.e. titano-alumino-phosphates and titano-silico-alumino-phosphates have very good adsorption capacities due to their microporous structure. However, the water adsorption power is still further increased compared with pure silico-alumino-phosphates by the insertion of $TiO_4$ tetrahedra into the typical CHA structure as the porosity is further increased by the inserted titanium.

Furthermore, titano-silico-alumino-phosphates have an exceptionally high thermal stability as well as hydrothermal stability, as a result of which they can preferably be used at high temperatures for adsorbing water.

Regenerable means that the water-containing adsorbent reversibly releases the adsorbed water under the action of heat. The titano-alumino-phosphate or silico-titano-alumino-phosphate is thereby recovered and can be used again for drying.

By titano-alumino-phosphates (general formula ($TiAlPO_4$-n)) are meant within the framework of the present invention microporous titano-alumino-phosphates.

By the term titano-alumino-phosphate is meant within the framework of the present invention as defined by the International Mineralogical Association (D. S. Coombs et al., Can. Mineralogist, 35, 1997, 1571) a crystalline substance from the group of aluminum phosphates with a spatial network structure. The present titano-alumino-phosphates preferably crystallize in the CHA structure (chabazite), and are classified according to IUPAC (International Union of Pure and Applied Chemistry) and the "Structure Commission of the International Zeolite Association" on the basis of their pore sizes. The three-dimensional structure has annular 8-membered structural units as well as single- and double-bonded 6-membered rings which are connected to regular, three-dimensional spatial networks. The spatial network structure has characteristic pores and channels which can be bonded together again via the corner-connected tetrahedra ($TiO_4$, $AlO_4$, $SiO_4$, $PO_4$) in one, two or three dimensions. The Ti/Al/P/Si tetrahedra are called the primary structural units the connecting of which results in the formation of secondary structural units.

Starting from titano-alumino-phosphates, so-called silico-titano-alumino-phosphates which correspond to the general formula $(Si_aTi_bAl_cP_d)O_2$ (anhydrous) are obtained by the isomorphic exchange of phosphorus with for example silicon.

Titano-alumino-phosphates which have a partial replacement of phosphorus by silicon, with a Ti/Si/(Al,P) ratio of from 0.01:1 to 0.5:1, preferably from 0.02:1 to 0.1:1, are particularly suitable.

In an embodiment of the invention, microporous titano-alumino-phosphates (TAPO) of the following type can be used: TAPO-5, TAPO-8, TAPO-11, TAPO-16, TAPO-17, TAPO-18, TAPO-20, TAPO-31, TAPO-34, TAPO-35, TAPO-36, TAPO-37, TAPO-40, TAPO-41, TAPO-42, TAPO-44, TAPO-47, TAPO-56.

TAPO-5, TAPO-11 or TAPO-34 is particularly preferably used.

In an embodiment of the invention, microporous silico-titano-alumino-phosphates (TAPSO) of the following type can be used: TAPSO-5, TAPSO-8, TAPSO-11, TAPSO-16, TAPSO-17, TAPSO-18, TAPSO-20, TAPSO-31, TAPSO-34, TAPSO-35, TAPSO-36, TAPSO-37, TAPSO-40, TAPSO-41, TAPSO-42, TAPSO-44, TAPSO-47, TAPSO-56.

TAPSO-5, TAPSO-11 or TAPSO-34 is particularly preferably used.

TAPSO-5, TAPSO-11 and TAPSO-34 are particularly suitable on account of their good properties as adsorbents and the low regeneration temperature. According to aspects of the invention the use of microporous titano-alumino-phosphates with CHA structure is particularly suitable.

In an embodiment of the invention microporous silico-alumino-phosphates (SAPO) of the following type can be used, wherein silicon can also partly be replaced by titanium, obtaining Ti-SAPOs with the following structure SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56.

SAPO-5, SAPO-11 or SAPO-34 is particularly preferably used.

A titano-alumino-phosphate that is doped with transition-metal cations or metal-exchanged preferably has the following formula:

$$[(Ti_xAl_ySi_zP_q)O_2]^{-a}[M^{b+}]_{a/b},$$

wherein the symbols and indices used have the following meanings: $x+y+z+q=1$; $0.010 \leq x \leq 0.110$; $0.400 \leq y \leq 0.550$; $0 \leq z \leq 0.090$; $0.350 \leq q \leq 0.500$; $a=y-q$ (with the proviso that y is preferably greater than q); $M^{b+}$ represents the cation with the charge b+, wherein b is an integer greater than or equal to 1, preferably 1, 2, 3 or 4, even more preferably 1, 2 or 3 and most preferably 1 or 2.

In addition to silicon, the titano-alumino-phosphates according to aspects of the invention can also contain other metals. Part of the phosphorus can also be replaced by titanium, and further metals such as iron, manganese, copper, cobalt, chromium, zinc and/or nickel. These are usually called SiTAPOs, FeTAPOs, MnTAPOs, CuTAPOs, CoTAPOs, CrTAPOs, ZnTAPOs, CoTAPOs or NiTAPOs. The types MTAPO-5, MTAPO-8, MTAPO-11, MTAPO-16, MTAPO-17, MTAPO-18, MTAPO-20, MTAPO-31, MTAPO-34, MTAPO-35, MTAPO-36, MTAPO-37, MTAPO-40, MTAPO-41, MTAPO-42, MTAPO-44, MTAPO-47, MTAPO-56 (with M=Si, Fe, Mn, Cu, Co, Cr, Zn, Ni) are particularly suitable. Particularly preferably MTAPO-5, MTAPO-11 and MTAPO-34.

In addition to silicon, the titano-alumino-phosphates according to aspects of the invention can also contain further metals. Ion exchange with iron, manganese, copper, cobalt, chromium, zinc and nickel proves particularly advantageous. TAPSO, FeTAPSO, MnTAPSO, CuTAPSO, CoTAPSO, CrTAPSO, ZnTAPSO, NiTAPSO are particularly suitable.

According to aspects of the invention the titano-alumino-phosphates can also be present doped, for which metal is embedded in the framework. Dopings with titanium and/or further metals such as iron, manganese, copper, cobalt, chromium, zinc and nickel prove particularly advantageous. FeAPSO, APSO, MnAPSO, CuAPSO, CrAPSO, ZnAPSO, CoAPSO and NiAPSO are particularly suitable.

Microporous MTAPSOs (M=Ti, Mn, Cu, Cr, Zn, Co, Ni), such as MTAPSO-5, MTAPSO-8, MTAPSO-11, MTAPSO-16, MTAPSO-17, MTAPSO-18, MTAPSO-20, MTAPSO-31, MTAPSO-34, MTAPSO-35, MTAPSO-36, MTAPSO-37, MTAPSO-40, MTAPSO-41, MTAPSO-42, MTAPSO-44, MTAPSO-47, MTAPSO-56 are particularly suitable.

MTAPSO-5, MTAPSO-11 or MTAPSO-34 is particularly preferably used.

The titano-alumino-phosphate according to aspects of the invention can further contain at least one further metal, selected from a group containing titanium, iron, manganese, copper, cobalt, chromium, zinc and nickel. Through the inclusion of one or more further metals the adsorption properties of the titano-alumino-phosphates improve further. These are usually called FeTiAPOs, MnTiAPOs, CuTiAPOs, CoTiAPOs, CrTiAPOs, ZnTiAPOs or NiTiAPOs. FeTiAPO-5 is particularly suitable.

According to aspects of the invention the titano-alumino-phosphate is used as fixed bed or bulk feed. A bulk titano-alumino-phosphate feed or titano-alumino-phosphate introduced in the fixed bed is particularly suitable, as it can easily be introduced into the adsorption container.

It is further of advantage if the titano-alumino-phosphate is present in the drying device according to aspects of the invention as bulk granular material in the form of small spheres, cylinders, beads, filaments, strands, small sheets, cubes or agglomerates, as the adsorptive surface of the titano-alumino-phosphate is thus increased, which makes possible a particularly efficient take-up of moisture.

The titano-alumino-phosphate can be used in the drying device according to aspects of the invention as binder-containing or binder-free granular material, whereby the incorporation into the drying device and the introduction into the adsorption container is simplified.

Advantageously the titano-alumino-phosphate can also be present in a coating on a pre-shaped part. The pre-shaped part can assume any desired geometric shape, such as e.g. hollow articles, sheets, grids or honeycombs. Application is usually as suspension (washcoat) or can take place with any further method known per se to a person skilled in the art.

The use as pre-shaped part is of advantage, as the adsorbent in the adsorption container in the adsorption device can thus be integrated in space-saving manner into the drying device according to aspects of the invention.

The drying device according to aspects of the invention has a reception space for receiving objects and appliances to be dried from which residual moisture is to be removed.

The one reception space of the drying device according to aspects of the invention comprises two reception spaces connected to each other, one of which comprises an adsorption device, containing an adsorption container, containing a titano-alumino-phosphate as adsorbent. The residual moisture of the objects and appliances to be dried is transported to the connected further reception spaces by means of an air stream and adsorbed by the adsorbent.

In a particular embodiment of the invention the drying device can contain a reception space through which the objects and appliances with residual moisture for drying can be transported. According to aspects of the invention the water from the moist air is taken up by the adsorbent, while the dried air as well as that heated by the heat of adsorption is returned again into the reception space in order to once more take up moisture there. Through this drying device, the drying of the objects and appliances with residual moisture can take place particularly quickly and efficiently.

The drying device can further contain a further reception space connected to it for objects and appliances with residual moisture. Through a simultaneous use of incoming air and outgoing air a continuous drying and loading of the drying device can take place. The further reception space can be loaded while moist air is guided to the adsorbent by an air stream in the first reception space. The dry, pre-heated air is guided to the further reception space, where it takes up moisture anew, while the first reception space can be unloaded and loaded. Such a drying device is important in particular for the catering trade, where very large quantities of dishes and cutlery have to be dried as quickly as possible. In order to render further work steps unnecessary, drying must take place uniformly, without leaving behind water spots or similar.

The drying device according to aspects of the invention further contains a heating device. The purpose of this is that, for quicker drying, the objects and appliances from which residual moisture is to be removed can be dried more quickly. The heating device can be used to heat up the objects and appliances and is preferably a heat radiator, a hot-air fan, an infrared radiator or a microwave radiator.

The heating device can also be used time-controlled, e.g. only after a predetermined period of time following the start of drying. The heating device can further be set such that it guarantees a continuingly constant temperature, avoiding overheating of the objects and appliances to be dried.

The capacity of the heating device is set such that according to aspects of the invention the drying proceeds more quickly and/or optionally the regeneration of the adsorbent can be carried out with it.

It is advantageous if the drying device according to aspects of the invention has a device for creating air streams. This device can be a fan, an air-pump, a compressor or a blower, and serves to transport the moist air out of the reception space to the connected further reception spaces and/or out of the drying device or back into the reception spaces.

According to aspects of the invention an above-atmospheric pressure can prevail in the reception spaces. The moisture is thus guided by the air stream under above-atmospheric pressure to the adsorption device, where it is adsorbed by the adsorbent. At the same time, because of the heat and the slight above-atmospheric pressure of the air stream, the water-containing adsorbent can be regenerated.

Preferably a heating fan can be used which has the function both of heating and of creating an air stream.

According to aspects of the invention a below-atmospheric pressure can also be produced in the drying device according to aspects of the invention with the help of the fan or of a vacuum device. By means of below-atmospheric pressure the moist air is removed even more quickly from the reception space, whereby the drying process becomes even more efficient.

The heating device contained in the drying device can furthermore be used to pre-heat the objects and appliances for easier drying, and also to regenerate the water-containing adsorbent accompanied by desorption. This can take place during operation with removal of the water-containing air stream from the adsorption device, or after a drying process.

The regeneration of the adsorbent can further take place directly before a drying process, as the expended residual heat of the regeneration can thus be used to pre-heat the objects and appliances with residual moisture, which makes easier drying possible.

The regeneration of the adsorbent can further already take place before a rinsing process, as the expended energy that is necessary for heating the rinsing water can thus be used at the same time to regenerate the adsorbent.

The drying device according to aspects of the invention can be used to remove residual moisture from objects and appliances also after a cleaning of the objects and appliances.

In a preferred embodiment the drying device according to aspects of the invention can be a dishwasher or a tumble dryer which can be used to dry and/or clean dishes or textiles.

The object of the present invention is further achieved by a method for drying objects and appliances with residual moisture using a drying device comprising the steps of
a) providing objects and appliances to be dried with residual moisture,
b) adsorbing residual moisture by the titano-alumino-phosphate in the adsorption device, obtaining water-containing titano-alumino-phosphate,
c) obtaining dried objects.

According to the method according to aspects of the invention objects and appliances from which residual moisture is to be removed are provided in a reception space.

The method according to aspects of the invention includes a further step of adsorbing residual moisture by the titano-alumino-phosphate, obtaining water-containing titano-alumino-phosphate.

According to aspects of the invention an air stream can whirl up the residual moisture adhering to the objects and appliances, whereby this can more easily be adsorbed by the titano-alumino-phosphate. This accelerates the process of drying the objects and appliances, as the titano-alumino-phosphate can adsorb more water per unit of time.

The objects and appliances with residual moisture can, if necessary, be heated by a hot air stream. Further, the hot air stream guides the residual moisture adhering to the objects and appliances out of the reception space to the adsorption device in which the provided titano-alumino-phosphate adsorbs the residual moisture, obtaining water-containing titano-alumino-phosphate.

According to aspects of the invention the drying of the objects and appliances with residual moisture can further take place accompanied by renewed use of the dried air. The hot, dry air takes up moisture in the reception space, is guided to the adsorption device, in which the moisture is taken up by the adsorbent. Because of the adsorption of the moisture, adsorption heat is now released, and this now heats the dried air. This dry, pre-heated air is conducted anew into the reception space, in which it can again take up moisture. Thus the drying of the objects and appliances can be made even more efficient.

In the method according to aspects of the invention the residual moisture reversibly adsorbed by the titano-alumino-phosphate amounts to between 5% and 30% of the residual moisture adhering to the objects to be dried. Through the adsorption of the residual moisture by the titano-alumino-phosphate the drying of the objects and appliances becomes quicker, more efficient, gentler and more uniform.

In the method according to aspects of the invention the titano-alumino-phosphate is used in a quantity by weight of from 0.1 to 10 kg preferably from 0.3 to 5 kg and most preferably from 0.5 to 2.5 kg. This depends on the quantity of objects and appliances to be dried. The quantity of adsorbent is adapted according to the number of drying processes, the quantity of objects and appliances to be dried, as well as above all the size of the drying device.

According to aspects of the invention a large quantity of titano-alumino-phosphate can also be used, preferably in a quantity by weight of from 10 to 100 kg, if the adsorbent does not have to be regenerated after every single drying process, but reliably adsorbs the moisture e.g. also in large quantities without regeneration.

According to aspects of the invention the adsorbent can be used in a quantity which corresponds to the quantity of the water to be absorbed. Further, a multiple of it can also be used. One to fifty times the quantity of the water to be absorbed can be used for this. Thus 1 l of water to be removed can correspond to a quantity of the adsorbent of from 1 kg to 50 kg, preferably 1 kg to 20 kg adsorbent per 1 l water.

According to aspects of the invention titano-aluminophosphates are prepared starting from a silicon source, aluminum source and phosphorus source, accompanied by conversion into a gel, addition of $TiO_2$ to the gel, obtaining a gel composition, and reaction of the gel composition, obtaining titano-alumino-phosphates.

EXAMPLE 1

100.15 parts by weight deionized water and 88.6 parts by weight hydrargillite (aluminum hydroxide SH10, available from Aluminum Oxid Stade GmbH, Germany) were mixed. 132.03 parts by weight phosphoric acid (85%) and 240.9 parts by weight TEAOH (tetraethylammoniumhydroxide) (35% in water), and then 33.5 parts by weight silica sol (Köstrosol 1030.30% silicon dioxide, available from CWK Chemiewerk Bad Köstriz, Germany) and 4.87 parts by weight silicon-doped titanium dioxide ($TiO_2$ 545 S, Evonik, Germany), were added to the obtained mixture, with the result that a synthetic gel mixture with the following molar composition was obtained:

A synthetic gel mixture with the following molar composition was obtained:

$Al_2O_3:P_2O_5:0.3\ SiO_2:0.1\ TiO_2:1\ TEAOH:35\ H_2O$

The synthetic gel mixture with the above composition was transferred into a special-steel autoclave. The autoclave was stirred and heated to 180° C., wherein this temperature was maintained for 68 hours. After the cooling the obtained product was filtered off, washed with deionized water and oven-dried at 100° C. An X-ray diffractogram of the obtained product showed that the product was pure TAPSO-34. The elemental analysis produced a composition of 1.5% Ti, 2.8% Si, 18.4% Al and 17.5% P, which corresponds to a stoichiometry of $Ti_{0.023}Si_{0.073}Al_{0.494}P_{0.410}$. According to an SEM (Scanning Electron Microscope) analysis of the product its crystal size lay in the range of from 0.5 to 2 μm.

To illustrate the present invention and its advantages, it is described with reference to the following examples, which are not to be regarded as limitative.

EXAMPLES

Method Part

Methods and appliances used are listed below, but are not to be regarded as limitative.

Pressure Chamber Test:

To investigate the adsorptivity and desorptivity of the titano-alumino-phosphate, a pressure chamber of the type "IGA003" from the company Hiden Analytical was used.

The necessary water vapour was produced in situ from a liquid reservoir. Measurement was static under vacuum. Prior to the measurement, vacuum tightness and high vacuum were set ($<10^{-5}$ mbar, externally on the high-vacuum connection with a Pfeiffer apparatus of the type "IKR 261").

The water vapour pressure was monitored inside the appliance by means of two pressure sensors of the type "Baratron" from the company MKS.

The temperature in the chamber was set with thermostats of the type RTE-111 from the company Neslab.

TAPSO-34 from the company Süd-Chemie AG was used for the embodiment example.

Zeolite 13 X from the company Süd-Chemie AG was used for the comparison example.

General Test Description:

General Desorption Test:

The regeneration of the water-containing titano-aluminophosphate can take place through thermal treatment at low temperatures of from 50° C. to 100° C. if a low pressure is applied.

The desorptivity of a water-containing titano-aluminophosphate as a function of water vapour pressure was tested in a pressure chamber with a relative air moisture of 38% and 63% and a partial water vapour pressure of up to 20 mbar. For this, the water vapour pressure was adjusted stepwise in a pressure chamber from 29 mbar to $10^{-3}$ mbar at a temperature of 25° C. The adsorbed quantity of water in the adsorption-desorption equilibrium was measured. The adsorption of water at over 20 pressure points was measured successively. After the water vapour pressure was set, the mass change to establishment of equilibrium was tracked up to 60 min.

It was shown that the adsorption-desorption equilibrium can be shifted according to the pressure applied. A water vapour pressure of 1 mbar is already sufficient for desorption to proceed with precedence over adsorption. An increase of the water vapour pressure to 3 mbar (corresponds to 9% relative air moisture at normal pressure) brings about an increase in the adsorbed quantity of water of over 20 wt.-%. This means that despite high moisture the adsorption-desorption equilibrium can be shifted to desorption by increasing the water vapour pressure.

General Part of the Test Description:

The adsorption and desorption behaviour of an adsorbent as a function of temperature was investigated in a heatable pressure chamber filled with water vapour.

Figure 1:
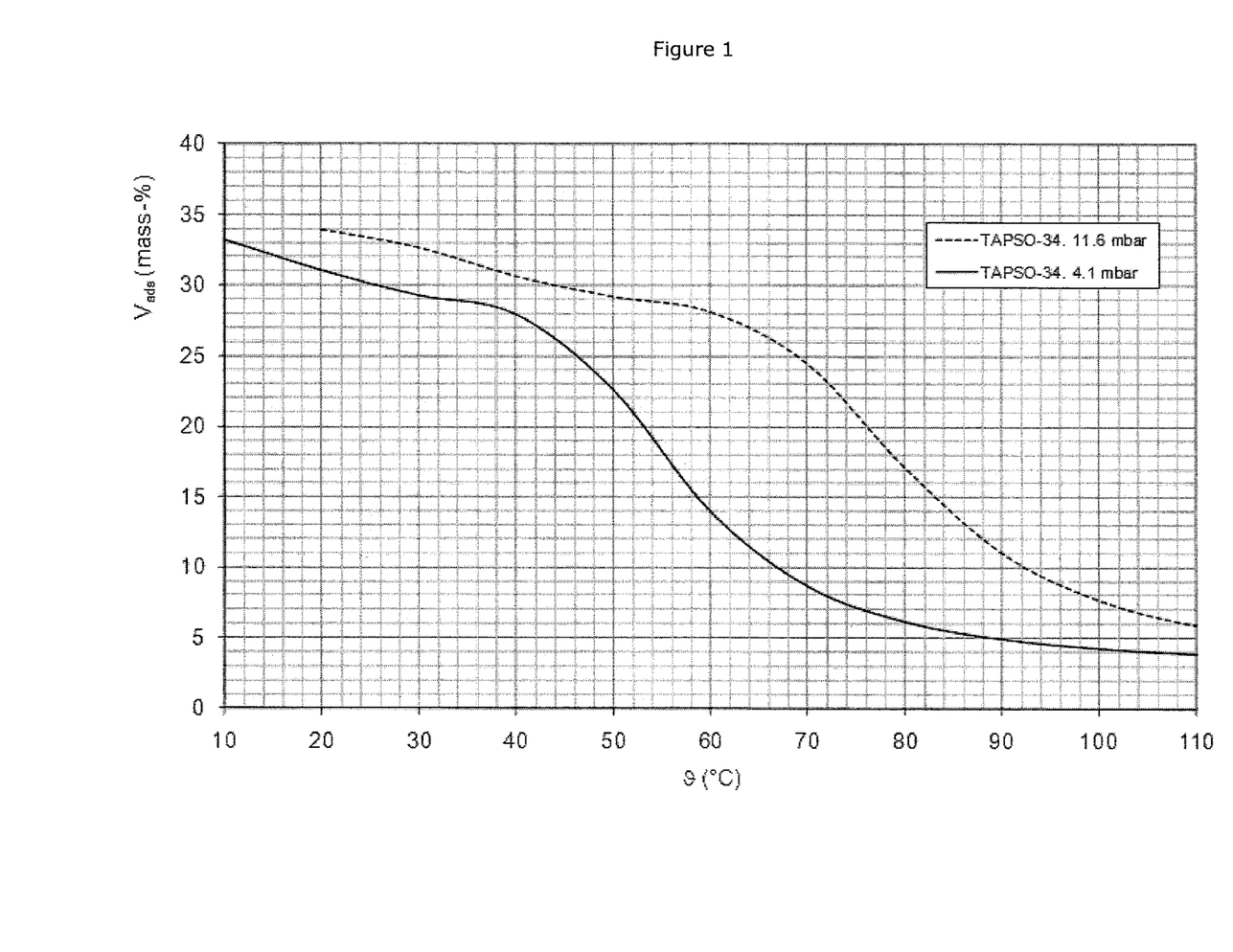
FIG. 1: the water adsorption rate and water desorption rate of a titano-alumino-phosphate, as a function of temperature and absorbed volume of water in per cent by weight [wt.-%], at 4.1 mbar and at 11.6 mbar water vapour pressure.
Figure 2:
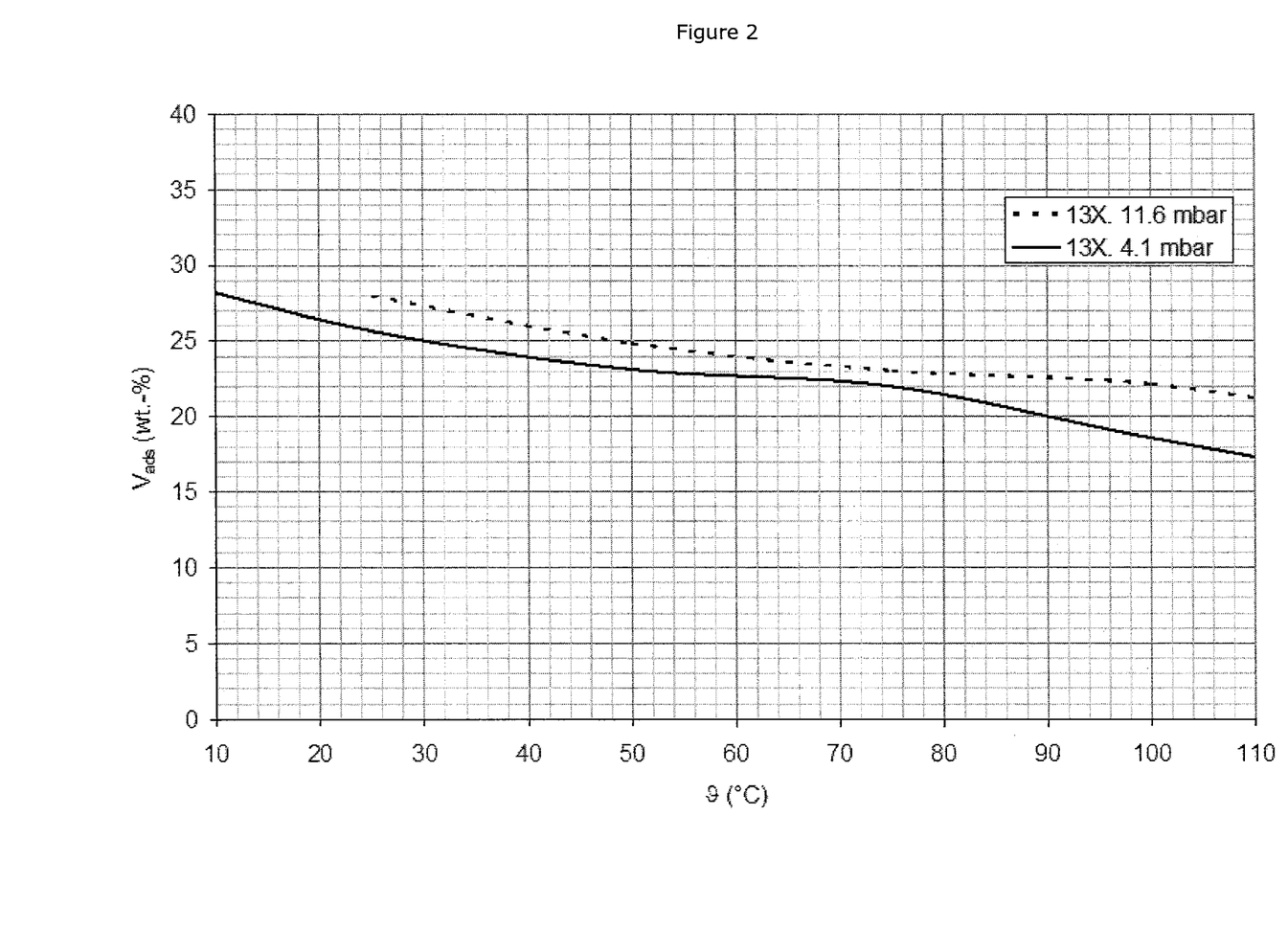
FIG. 2: the water adsorption rate and water desorption rate of the zeolite 13 X, of the state of the art, as a function of temperature and absorbed volume of water in per cent by weight [wt.-%], at 4.1 mbar and at 11.6 mbar water vapour pressure.

For this, the water vapour pressure was adjusted in a pressure chamber to 4.1 mbar (see FIG. 1 and FIG. 2: solid line) as well as to 11.6 mbar (see FIG. 1 and FIG. 2: broken line).

There took place first a series of tests at different temperatures at a constant water vapour pressure of 4.1 mbar, then a further series of tests at different temperatures at a constant water vapour pressure of 11.6 mbar in the pressure chamber.

The series of tests were carried out at temperatures of from 10° C. to 110° C., in each case at 4.1 mbar as well as at 11.6 mbar. The temperature was set in the pressure chamber with a thermostat, and only after the temperature had been kept constant for 10 min was a corresponding quantity of adsorbent fed into the pressure chamber via a corresponding valve.

EMBODIMENT EXAMPLE

TAPSO-34 was used in the embodiment example.

The series of tests at 4.1 mbar water vapour pressure show for low temperatures of from 10° C. to 40° C. that a lot of water is adsorbed. The values of the adsorbed water lie here in a range of from 30 wt.-% to approx. 35 wt.-% (see FIG. 1).

If the temperature is increased, then in the temperature range of from 40° C. to 70° C. the adsorption rate of adsorbed water falls from 30 wt. % to approx. 5 wt. % (FIG. 1).

In the temperature range of from 80° C. to 110° C., however, the adsorption rate of adsorbed water hardly falls. In this temperature range the adsorption rate remains relatively constant, at roughly below 5 wt.-% adsorbed water (FIG. 1).

At higher water vapour pressure of 11.6 mbar (FIG. 1, broken line) the fall in the adsorption rate slows down. In the temperature range of from 20° C. to 60° C. the adsorption rate of the adsorbed water remains relatively constant at 35 wt. % to 30 wt.-%.

If the temperature is increased to 70° C. the adsorption power of the SAPO-34 starts to fall. A more pronounced decrease in the adsorption rate begins at a temperature of from 70° C. to 90° C. (25 wt.-% to 5 wt.-% adsorbed water).

The lowest adsorption rates of the SAPO-34 lie at temperatures above 90° C., the adsorption rate comes close to roughly 5 wt.-% here.

It is clear from FIG. 1 that TAPSO-34 adsorbs less water at higher temperatures and the adsorption rate falls. Adsorption and desorption are competing with each other. The equilibrium shifts to desorption at higher temperatures.

Depending on the pressure, there is thus already an increased desorption at 4.1 mbar at above 40° C. This means that low temperatures are already enough to reversibly remove the adsorbed water from SAPO-34.

COMPARISON EXAMPLE

A corresponding quantity of zeolite 13 X was used in the comparison example. The zeolite 13 X belongs to the FAU structure class, to the group of the zeolite X, which in particular also contains the group of the faujasites. Zeolite 13 X has a pore size of 13 Å, and is used as a molecular sieve for the adsorption of water and water vapour.

The comparison example of the zeolite 13 X shows (FIG. 2) that the adsorption rate is influenced only a little by the temperature. Here no shift of the adsorption-desorption equilibrium takes place within the investigated temperature range of from 10° C. to 150° C.

FIG. 2 shows that the water vapour pressure has only a very little influence on the adsorption behaviour of the zeolite 13 X.

The slow fall in the adsorption rate shows that a reversal of the adsorption-desorption equilibrium requires a much higher temperature (>>150° C.). This means that to regenerate water-containing zeolite 13 X a temperature many times higher than was investigated in the test is necessary.

What is claimed:

1. A drying device with thermal management, comprising a dishwasher or a tumble dryer, said dishwasher or tumble dryer comprising at least one reception space for receiving objects and/or appliances having residual moisture to be dried, an adsorption device comprising an adsorption container containing of a regenerable titano-alumino-phosphate as adsorbent, and a device for transporting air streams comprising residual moisture and/or residual heat from the reception space into the adsorption container, wherein the adsorbent is at least partly regenerated by transfer of at least a portion of the residual heat to the adsorbent.

2. The drying device of claim 1, wherein the titano-alumino-phosphate is a regenerable silico-titano-alumino-phosphate (TAPSO).

3. The drying device of claim 2, wherein the silico-titano-alumino-phosphate is a microporous silico-titano-alumino-phosphate (TAPSO) of the type TAPSO-5, TAPSO-8, TAPSO-11, TAPSO-16, TAPSO-17, TAPSO-18, TAPSO-20, TAPSO-31, TAPSO-34, TAPSO-35, TAPSO-36, TAPSO-37, TAPSO-40, TAPSO-41, TAPSO-42, TAPSO-44, TAPSO-47, or TAPSO-56.

4. The drying device of claim 2, wherein the silico-titano-alumino-phosphate (TAPSO) contains at least one further metal selected from the group consisting of silicon, iron, manganese, cobalt, copper, chromium, zinc and nickel.

5. The drying device of claim 1, wherein the titano-alumino-phosphate further contains at least one metal or semimetal selected from the group consisting of silicon, titanium, iron, manganese, copper, chromium, zinc, cobalt and nickel.

6. The drying device of claim 1, in which the titano-alumino-phosphate is present as fixed bed or bulk material feed.

7. The drying device of claim 6, wherein the titano-alumino-phosphate is present as bulk binder-containing or binder-free granular material.

8. The drying device of claim 1, in which the titano-alumino-phosphate is present in a coating on a pre-shaped part.

9. The drying device of claim 1, wherein the at least one reception space comprises at least two reception spaces connected to each other at least one of which comprises the adsorption container.

10. The drying device of claim 1, further comprising a heating device.

11. The drying device of claim 1, wherein the device for transporting air streams comprises a fan to create an air flow.

12. The drying device of claim 1, wherein above-atmospheric pressure or below-atmospheric pressure prevails in the reception space.

13. A method for drying objects and appliances with residual moisture, comprising the steps of:
   a) providing objects to be dried with residual moisture;
   b) adsorbing the residual moisture in a drying device comprising an adsorption container containing a titano-alumino-phosphate as adsorbent to obtain water-containing titano-alumino-phosphate, dried objects, and residual heat; and
   c) at least partly regenerating the water-containing titano-alumino-phosphate by transferring at least a portion of the residual heat to the adsorbent.

14. The method of claim 13, wherein the titano-alumino-phosphate reversibly adsorbs between 5% and 30% of the adhering residual moisture.

15. The method of claim 14, wherein the titano-alumino-phosphate is used in a quantity by weight of from 0.1 kg to 10 kg.

16. The method according to claim 15, wherein the titano-alumino-phosphate is regenerated using the residual heat in the drying device, further comprising the steps of
   a) regenerating the water-containing titano-alumino-phosphate by means of a thermal treatment,
   b) obtaining regenerated titano-alumino-phosphate in the adsorption device and water-containing air,
   c) removing the water-containing air by means of air flow.

17. The method of claim 16, wherein the thermal treatment is carried out at 50° C. to 100° C.

18. A method for producing titano-alumino-phosphates comprising the steps
   a) providing a silicon source, aluminium source and phosphorus source,
   b) converting the silicon, aluminium and phosphorus source into a gel,
   c) adding $TiO_2$ to the gel, obtaining a gel composition, and
   d) reacting the gel composition, obtaining titano-alumino-phosphates.

* * * * *